United States Patent Office 2,973,276
Patented Feb. 28, 1961

2,973,276
PROCESS OF DEHYDRATING POTATOES

Joseph W. Cyr, Pittsfield, Maine, assignor to Snow Flake Canning Co., Brunswick, Maine, a corporation of Maine No Drawing. Filed Dec. 19, 1956, Ser. No. 629,252

3 Claims. (Cl. 99—207)

This invention relates to dehydrated potato units and methods of making the same and has for its object to provide dehydrated potato units which are less subject to breakage than the dehydrated potato units now on the market.

A further object of the invention is to provide a process of producing the improved units which can be carried out with the conventional equipment now in use and without significant increase in cost.

Dehydrated potato units in various sizes and shapes are now produced and sold in substantial quantities. Popular sizes are 3/8" cubes and "dice" of 3/8" x 3/8" x 3/16" dimensions. These units are used in making stews, chowders, and the like, and in such products it is important that units be in their original unbroken shapes. In freshly dehydrated potatoes very little breakage occurs but after ten days or two weeks in storage the dehydrated units begin to develop cleavage lines and break apart. Such breakage continues throughout the storage period.

I have discovered that this breakage can be substantially reduced by treatment with a weak sodium chloride solution and to a somewhat lesser extent by treatment with solutions of sodium nitrate and ammonium chloride. Mixtures of such solutions may also be used particularly where it is desirable to avoid significant addition of salt to the food.

In carrying out my invention, I preferably substitute for the blanch with hot water or steam to which the fershly cut potato units are subject in the process of dehydration now in common use, a five minute blanch with an aqueous solution of sodium chloride. For dice 3/8" x 3/8" x 3/16" a concentration of 2% has been found to give satisfactory results with no detectable difference in flavor. A 3% solution gives somewhat better results but there may be a detectable change in flavor. With potato units in the form of 3/8" cubes the 3% solution may be employed without change in flavor, probably because of the smaller ratio of surface to volume and a lesser absorption of the solution in proportion to the potato mass. The solution used for blanching should be heated to near boiling. In operations carried out at plants located at elevations near sea level a temperature of 210° F. has been found most satisfactory. If a lesser degree of blanching is desired the time may be shortened and a stronger solution employed. Instead of adding the salt to the blanching solution the potato units may be steam blanched and then dipped in a salt solution at approximately 100° F. for 5 minutes. The same concentration of salt should be used in the dip solutions as in the hot solutions used for blanching. The concentration and temperature of the solution are not critical nor is the time of treatment. Concentrations above 3% seem to give very little if any or better results with potato units of the above-mentioned sizes and may impart an undesirable saltiness. With larger size units of shapes such that the ratio of surface to mass is small, greater concentrations may be advantageously employed.

The following examples are typical of the results obtained by the described treatment:

Example 1.—3/8" cubes given a plain water blanch showed 68% fractured cubes in 39 days; yet material from the same sample given a 2% sodium chloride solution blanch showed but 14% over the same time interval, and that given a 3% sodium chloride solution blanch, 0%. However, these last were checked again at the end of 116 days and showed 2.6% fractures against more than 72% (at this point many of the fractured pieces were broken into two or more pieces) for the plain water blanched sample.

Example 2.—3/8" cubes treated by dipping in a sodium chloride solution at 100° F. for 5 minutes showed a similar effect—the regular steam blanched material after 92 days showing 17% fractured; while similar material dipped for 5 minutes in a 2% sodium chloride solution at 100° F. after the regular steam blanch showed 7%; and, that given a 5 minute dip in a 3% solution only 2.5%.

While not conclusively established by any tests as yet devised, I am convinced that the salt solution partially dissolves some of the pectic substances which bind the individual starch cells, thus lessening the strain that is normally set up when the units are heated above 150° F. This strain is due, in part at least, to the gelatinization of the starch. The gelatinization causes the individual starch cells to become more nearly spherical in shape and this change in shape produces a separating force which is counteracted by the binding action of the pectic substances. The salt solution softens the pectic substances so that the change in shape of the starch cells can take place without setting up these internal strains.

As stated above, ammonium chloride and sodium nitrate can be substituted in whole or in part for the sodium chloride and it is believed that these salts are effective because they also partially dissolve the pectic substances. Other compounds may be found which have a similar action and are innocuous and do not impart a detectable change in taste to the potato units.

It will also be understood that other changes in the process may be made within the scope of the appended claims.

I claim:

1. The process of dehydrating potatoes to substantially reduce the breakage thereof in packing and shipping which consists in cutting the potatoes into small units, immersing the freshly-cut units in an aqueous solution of a reagent taken from the class consisting of sodium chloride, ammonium chloride, and sodium nitrate of a concentration of the order of 3 percent for a period in the order of five minutes to partially dissolve the pectic substances surrounding the starch cells, the temperature of said aqueous solution being not substantially less than approximately 100° F., and thereafter drying the units while still wet with the salt solution to a water content not exceeding 12 percent.

2. The process of claim 1 wherein the reagent is an aqueous solution of sodium chloride.

3. The process of claim 1 wherein the potato units are blanched with steam before treatment with the reagent.

References Cited in the file of this patent

UNITED STATES PATENTS

| | | |
|---|---|---|
| 1,259,635 | King | Mar. 19, 1918 |
| 2,681,285 | Hendel et al. | June 15, 1954 |
| 2,705,679 | Griffiths et al. | Apr. 5, 1955 |